Oct. 22, 1968  A. ROSAT-GONZALEZ  3,406,442
MANUFACTURE OF CONTAINERS FOR LIQUIDS
Filed May 17, 1966
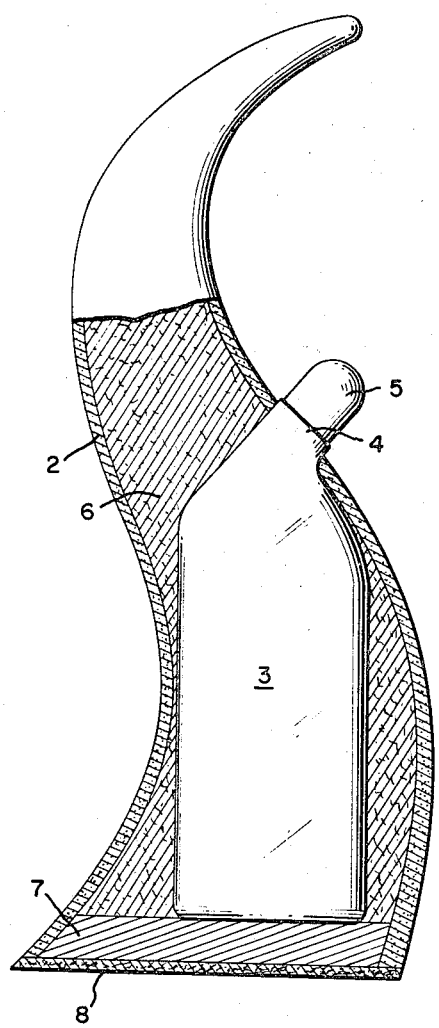
INVENTOR
ANTONIO ROSAT-GONZALEZ
BY *Wenderoth, Lind & Ponack*
ATTORNEYS United States Patent Office 3,406,442
Patented Oct. 22, 1968

3,406,442
MANUFACTURE OF CONTAINERS FOR LIQUIDS
Antonio Rosat Gonzalez, 6 c/Bismarck,
Barcelona, Spain
Filed May 17, 1966, Ser. No. 550,661
3 Claims. (Cl. 29—455)

This invention relates to a process for the manufacture of containers for liquids and the like.

An object of the invention is to manufacture containers of beauty for containing perfumes, liquors, etc.

The main object consists of arranging, as an exterior wrapping of the container and, accordingly, for ornamental purposes, a natural horn, emptied and curved, and suitably arranged on the inside is a recipient of a material such as glass, blown glass, plastic, leather, wood, etc., etc.

A further object is to use a horn, which being natural, will present an infinity of warped shapes, all of them within the common characteristic shape.

With the above and other objects in view which will become apparent from the detailed description below, a preferred embodiment of the invention is shown in the drawing which is a partial elevation and sectional view.

The animal horn 2 is emptied and cured so as to hold at its inside a recipient or container 3 of glass or any other material. The mouth of the recipient projects outwardly from the horn through an opening provided in the side of the horn. This opening is made very exact so that practically only the stopper or occluding medium 5 is visible from the outside.

When the recipient 3 has been located inside the horn the remainder of the space in such horn is filled with a light material 6 in order to fix the recipient 3 in a fixed position within the horn.

The base of the horn is closed by a plate 7 covered by a felt 8 or the like, which will maintain the horn with its recipient in upright position.

The irregular or undetermined shape of each horn or body will mean that the recipients located inside them must be adjusted in an approximate manner, and those which may be of a rigid material must be manufactured especially in accordance with the horn where they must be placed. In the precise instance of a glass or blown glass recipient, the perfect adjustment of same inside the horn will not offer any difficulty.

The mouth of the recipient will be arranged on the side part, at the tip or at the base of said horn, and will be adjusted as much as possible to the hole made in the horn for this purpose, the mouth of the recipient being located or situated in any place on the horn in order to take the greatest possible advantage of its capacity.

The mouth may be closed by means of a plug, valve, tap or similar element.

In order to assure the stability of the recipient inside the horn, the excess space may be filled on the basis of very light materials, such as, for example, wood shavings, synthetic foams, etc., etc.

It is thought that the invention and its advantages will be understood from the foregoing description and it is apparent that various changes may be made in the process, construction and arrangement of the parts without departing from the spirit and scope of the invention or sacrificing its material advantages, the process hereinbefore described and illustrated being merely a preferred embodiment of the invention.

I claim:
1. A process for the manufacture of containers for liquids comprising emptying and curing an animal horn, forming a hole in the side thereof, fixing a recipient inside said horn conforming to the internal configuration of said horn having a mouth projecting outwardly through said hole so that only the occluding medium for said mouth is visible.

2. A process according to claim 1, wherein a cushioning medium is arranged between the walls of said recipient and the internal wall of said horn to prevent movement or displacement of said recipient.

3. A process according to claim 1 wherein the base of said horn is closed by a flat surface to serve as a base for its holding and maintenance in postion.

References Cited

UNITED STATES PATENTS

| | | | |
|---|---|---|---|
| 736,626 | 8/1903 | Porta | 215—13 X |
| 2,041,481 | 5/1936 | Otar | 220—9 |
| 2,410,179 | 10/1946 | Nygren | 29—455 X |
| 2,413,639 | 12/1946 | Martin | 29—455 |
| 2,610,757 | 9/1952 | Irwine. | |
| 2,622,755 | 12/1952 | Jacques | 220—17 X |

CHARLIE T. MOON, *Primary Examiner.*